July 30, 1940. L. R. SPENCER 2,209,480
VALVE ACTUATING MECHANISM
Filed Feb. 15, 1939
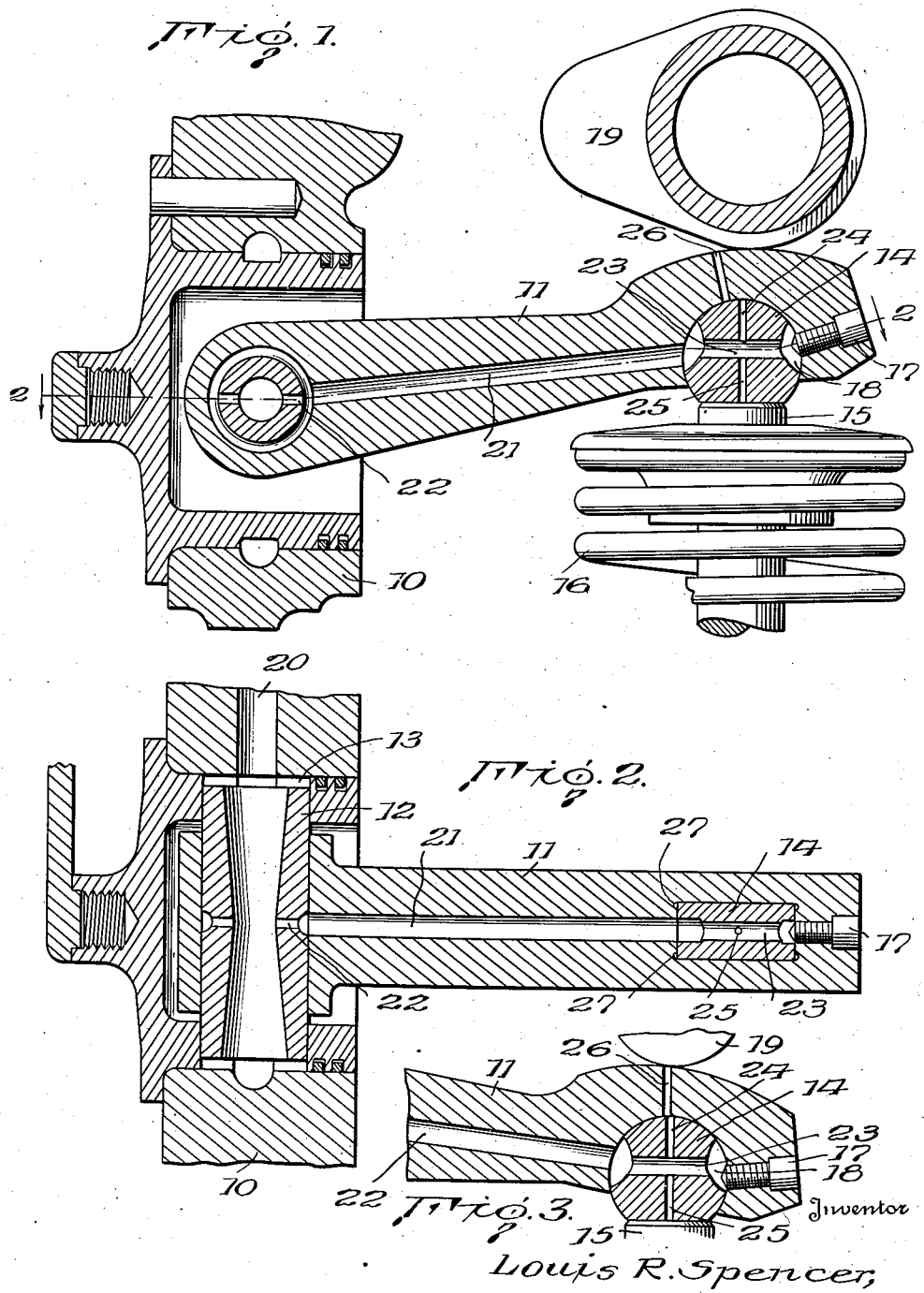
Inventor
Louis R. Spencer,
By Church & Church
His Attorneys Patented July 30, 1940

2,209,480

UNITED STATES PATENT OFFICE 2,209,480

VALVE ACTUATING MECHANISM

Louis R. Spencer, West Hartford, Conn., assignor to Spencer Aircraft Motors, Inc., Hartford, Conn., a corporation of Connecticut Application February 15, 1939, Serial No. 256,581

9 Claims. (Cl. 184—6)

This invention relates to improvements in valve actuating mechanisms.

The primary object of the invention is to provide a valve actuating mechanism wherein those surfaces normally subjected to wear will be properly and amply lubricated.

The present mechanism comprises a rocker arm adapted to be engaged by a cam by which it is depressed, and also provided with a valve stem engaging member capable of rotating within a recess in said arm, and a further object of the invention is to provide proper lubrication for the surface of the arm which is engaged by the actuating cam and for the surface of the valve stem engaging member, particularly that portion of said member which actually engages the valve stem.

A still further object is to provide a mechanism in which the quantity of lubricant supplied to the surface of the arm engaged by the actuating cam may readily be varied.

A still further object is to provide the mechanism with a lubricating system, by means of which the supply of lubricant to the surface of the arm engaged by the actuating cam will be cut off intermittently so as to prevent the loss of lubricant which would occur at times when the oil passage leading to said surface is uncovered.

Another object is to provide a valve actuating mechanism in which the rocker arm is not only capable of a rocking motion, but is also permitted a slight movement axially of its shaft, whereby, when the mechanism forms part of the power unit of aircraft, said arm will be capable of moving slightly axially of its shaft as the inclination forwardly or rearwardly of the aircraft varies.

With these and other objects in view, the invention consists in certain details of construction and combinations and arrangements of parts, all as will hereinafter be more fully described, and the novel features thereof particularly pointed out in the appended claims.

In the accompanying drawing illustrating the preferred embodiment of the invention—

Figure 1 is a vertical sectional view taken longitudinally of the rocker arm;

Fig. 2 is a horizontal sectional view on the line 2—2 of Fig. 1; and

Fig. 3 is a view similar to Fig. 1 illustrating the rocker arm in its lower, or depressed, position.

A portion only of the motor casing 10 is illustrated, sufficient to illustrate the mounting of the rocker arm 11. Preferably, arm 11 is mounted on a shaft 12 journaled in the casing 10 and, as illustrated in Fig. 2, a slight clearance is provided at each end of shaft 12, as indicated at 13, whereby said shaft is permitted a slight axial movement. The present mechanism is primarily adapted for use in power units for aircraft and, by reason of this limited axial movement of which the shaft 12 is capable, it is apparent that the shaft can move in one direction or the other whenever the aircraft is disposed at an inclination to the horizontal. In other words, if the craft is moving downwardly, nose first, the shaft can slide in one direction while, if the craft is nosed upwardly, the shaft can slip slightly in the opposite direction. This arrangement precludes scoring of the valve stem under such navigating conditions.

Secured in the outer, or free, end of rocker arm 12 is a valve engaging member or disc 14 provided with a flattened surface adapted to engage against the upper extremity of the valve stem 15, the valve stem being normally urged upwardly by spring 16. To facilitate assembly and substitution of valve engaging members, the present member is of disc-like formation, as indicated in Fig. 2, and its breadth on a line medial of its flattened surface is less or, perhaps, substantially equal to, the breadth of the entrance to the recess in the arm in which said member is positioned. In this way, said member can be readily inserted in the recess in the arm and then, by being slightly rotated, its flattened surface can be properly disposed to engage against the valve stem. As will hereinafter be more fully pointed out, it is desirable that member 14 be capable of at least a limited turning motion within its recess, but in order to prevent its turning to an extent which would position its flat surface at a point where it might be accidentally dislodged, a locking screw 17 is provided in the end of the rocker arm with the inner end of the screw projecting into the socket for said member and into a recess 18 in the surface of member 14. Preferably, the member 14 is provided with recesses 18 at its opposite sides in order that the parts may be properly assembled, even though the member 14 might be turned around, so to speak, from the position in which it is shown when being inserted in its socket. Thus, if the member 14 becomes unduly worn and it is desired to replace it with a new member, it is only necessary to back off the screw 17 slightly and rotate said member to position its flat surface within the mouth of the socket whereupon it can be readily slipped out and another substituted. In other words, there is no spinning over of metal to retain the member 14 in its socket. This feature of interchangeability is more fully described and claimed in applicant's copending application, Serial No. 212,346, filed June 7, 1938.

The rocker arm 11 is depressed by a rotating cam 19 engaging against the upper surface of the free end of said arm. To properly lubricate that surface engaged by the cam 19, and also the contacting surfaces of the disc 14 and valve stem 15, means are provided for supplying lubricant through the arm to each of these localities. Preferably, the housing or casing 10 is formed with an oil passage 20 and the rocker arm shaft 12 is of tubular formation, so that oil supplied through the passage 20 can gain access to a duct 21 in the rocker arm through a radial passage 22 in the shaft. Duct 21 communicates with the socket in which the member 14 is mounted and said member is also formed with a comparatively large cross duct 23 provided with oppositely disposed branches 24, 25, one of which extends to the flat surface of said member. The other duct in said member, duct 24 in the present instance, is adapted to be intermittently placed in communication with a discharge duct 26 in the rocker arm, this duct 26 terminating at a point on the surface of said arm where the latter is engaged by the higher portion of the cam 19.

As previously mentioned, the disc 14 is capable of a slight rocking motion within its socket, so that said disc and arm have a limited relative movement with respect to each other as the arm is lowered and raised under the influences of cam 19 and spring 16, respectively. As shown in Fig. 1, when arm 11 is in its upper position, duct 26 is located some little distance to one side of duct 24 so that the flow of lubricant to the exterior surface of the arm is cut off but, when the arm is depressed, duct 26 is in communication with duct 24, as shown in Fig. 3. As shown in Fig. 3, duct 26, although in communication with duct 24, is still not in absolute registry with said duct 24 but, as will be appreciated, the extent to which the two ducts overlap, so to speak, when the arm is depressed, as shown in Fig. 3, may be readily regulated by altering the disposition of either one of said ducts. For instance, a series of discs 14 could be made available for use with the duct 24 in the several discs so located that each one would bear a different offset relationship to the duct 26, the relationship of the duct in one of said discs being such that it would fully register with the duct 26 when the arm is depressed, while the ducts in the other discs of such a series would have a relationship that would reduce the extent of registration thereof with the duct 26. Thus, by the use of any particular one disc of such a series, the amount of lubricant supplied through duct 26 each time it moved in communication with duct 24 could readily be controlled. By having the ducts 24, 26, move into and out of registry with one another during each cycle of operations of the rocker arm, an excessive supply of lubricant to the surface of the arm is prevented, even though the discharge end of the duct 26 is only intermittently closed by being covered by the surface of the cam 19. It will be observed that the ducts 24, 26, are in communication at the time the rocker arm is depressed, under which circumstances duct 25 is rather effectually sealed by the valve stem due to the pressure imposed on the rocker arm. Thus, an ample supply of lubricant through ducts 24, 26, is insured. However, on the upward movement of the rocker arm, this pressure is relieved somewhat, and when the valve stem is in its uppermost position, there is a slight clearance between the arm and stem to permit proper seating of the valve. As a consequence, the lubricant can then flow freely through duct 25. As indicated, it is preferred that duct 23 extend entirely through disc member 14, so that said member cannot be erroneously assembled but, so far as proper functioning of the lubricant system is concerned, it is merely necessary that duct 23 extend to the cross ducts 24, 25.

In order to permit the proper finishing of the surface of the socket in which the disc member 14 is secured, it is preferred that annular grooves or recesses 27 be formed at the side edges of said surface. In this way, the desired finishing tool may be moved into engagement with the entire bearing surface of the socket and no fillets will be left in the corners, such as would interfere with the installation of the disc in the socket.

With the present construction, it will be apparent that those surfaces of the valve actuating instrumentalities which are normally subject to the greatest wear will be properly lubricated at all times and still there will be no danger whatever of there being an excessive supply or waste of lubricant.

What I claim is:

1. In a valve actuating mechanism, a rocker arm having a recess and a lubricant supply duct therein, a cam engaging surface on said arm, a valve stem engaging member in said recess, said member having a lubricant passage therein in constant communication with said duct, said passage having a terminal at the stem engaging surface of said member, and said arm having a lubricant passage intermittently communicating with the passage in said member, the passage in the arm terminating at the cam engaging surface of the arm.

2. In a valve actuating mechanism, a rocker arm having a recess therein and an oil passage extending from said recess, and a valve stem engaging member in said recess, said member having an oil passage therein movable into and out of registry with the passage in the arm and said member and arm being movable relatively to each other to intermittently position said passages in registry with each other.

3. In a valve actuating mechanism, a rocker arm having a recess therein and an oil passage extending from said recess, and a valve stem engaging member in said recess, said member having an oil passage therein and said member and arm being movable relatively to each other to move the ends of said passages into overlapping relationship with each other to establish communication between said passages, one of said passages being offset with respect to the other and the extent of overlap of the two passages being determined by the degree of offset between the two passages.

4. In a valve actuating mechanism, a rocker arm having a recess therein with an oil supply duct and an oil discharge duct communicating with said recess, and a valve stem engaging member in said recess interposed between said ducts, said member having an oil duct therein opening at one end into said recess and having branches extending to the surface of said member, said member and arm being movable relatively to each other to intermittently place one of the branches in the duct of said member in partial registry with the discharge duct in the arm the other branch of the duct in said member being in constant communication with the oil supply duct in the rocker arm.

5. In a valve actuating mechanism comprising a rocker arm having a lubricant supply duct therein, a valve stem engaging member in said arm, means engaging said arm for depressing the latter, and lubricant passages through said member to the stem engaging surface of said member and to the surface of said arm engaged by said depressing means, the flow of lubricant to said surface of the arm through said duct and one of said passages being intermittent and occurring only while said arm is depressed and said supply duct and the passage to said stem-engaging surface being in constant communication with each other, said last-mentioned passage being substantially sealed when the valve-stem-engaging member is depressed against the valve stem.

6. In a valve actuating mechanism, a rocker arm, a valve stem engaging member in said arm, and means engaging said arm to depress the same, and means for supplying lubricant through said member to the surface of the member engaging the stem and to the surface of the arm engaged by said arm depressing means, said supply means comprising oil ducts in said arm and member movable into registry with each other by a downward movement of the arm and out of registry with each other during the return upward movement of said arm.

7. In a valve actuating mechanism, a rocker arm, a shaft on which said arm is carried, and means for rocking said arm, said arm having a limited sliding movement in opposite directions axially of the shaft, an oil passage extending through said arm terminating at the surface engaged by said rocking means, and means for interrupting flow of oil through said passage during movement of the arm in one direction.

8. In a valve actuating mechanism, a rocker arm, a shaft on which said arm is mounted, and means for rocking said arm, said arm having a limited lateral movement in opposite directions axially of said shaft, and an oil passage through said arm terminating at the surface of the arm engaged by said rocking means, the flow of oil through said passage being limited to the period during which the arm is depressed.

9. In a valve actuating mechanism, a rocker arm having a recess therein, a cam engaging surface on said arm, a valve stem engaging member in said recess, said member having a lubricant passage and said arm having a lubricant passage terminating at said cam engaging surface, said member being interposed in the passage in the arm and being movable relatively to said arm to periodically effect registry of the member passage with the arm passage and establish communication through said passage to said cam engaging surface.

LOUIS R. SPENCER.